United States Patent
Li et al.

(10) Patent No.: US 9,050,984 B2
(45) Date of Patent: Jun. 9, 2015

(54) ANOMALOUS RAILWAY COMPONENT DETECTION

(75) Inventors: Ying Li, Mohegan Lake, CT (US); Sharathchandra U. Pankanti, Darien, CT (US)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 13/451,610

(22) Filed: Apr. 20, 2012

(65) Prior Publication Data

US 2013/0279743 A1 Oct. 24, 2013

(51) Int. Cl.
G06K 9/00 (2006.01)
B61L 23/04 (2006.01)
G06T 7/00 (2006.01)

(52) U.S. Cl.
CPC ............. B61L 23/042 (2013.01); G06T 7/0004 (2013.01); *G06T 2207/20144* (2013.01); *G06T 2207/30136* (2013.01); *G06T 2207/30164* (2013.01); *G06T 2207/30242* (2013.01); *G06T 2207/30252* (2013.01)

(58) Field of Classification Search
CPC ...... B61L 23/042; G06K 9/62; G06T 7/0002; B61K 5/00
See application file for complete search history.

(56) References Cited

U.S. PATENT DOCUMENTS

| | | | |
|---|---|---|---|
| 5,487,341 A | 1/1996 | Newman et al. | 104/17.1 |
| 7,164,975 B2 * | 1/2007 | Bidaud | 701/19 |
| 7,755,660 B2 * | 7/2010 | Nejikovsky et al. | 348/143 |
| 8,412,393 B2 * | 4/2013 | Anderson et al. | 701/19 |
| 2002/0078853 A1 | 6/2002 | Holmes et al. | 104/2 |
| 2006/0017911 A1 | 1/2006 | Villar et al. | 356/4.01 |
| 2006/0098843 A1 * | 5/2006 | Chew | 382/103 |
| 2011/0146527 A1 | 6/2011 | Plyler et al. | 104/16 |
| 2013/0231873 A1 * | 9/2013 | Fraser et al. | 702/35 |

OTHER PUBLICATIONS

Amit Adam et al, "Robust Real-Time Unusual Event Detection Using Multiple Fixed-Location Monitors", IEEE Transactions on Pattern Analysis and Machine Intelligence, vol. 30, No. 3, pp. 555-560 Mar. 2008.

Claudio Piciarelli, et al., "Trajectory-Based Anomalous Event Detection", IEEE Transactions on Circuits and Systems for Video Technology, vol. 18, No. 11, pp. 1544-1554, Nov. 2008.

Arslan Basharat, et al., "Learning Object Motion Patterns for Anomaly Detection and Improved Object Detection", pp. 1-8, publication unknown.

Zhouyu Fu, "Similarity Based Vehicle Trajectory Clustering and Anomaly Detection", pp. 1-4, publication unknown.

(Continued)

*Primary Examiner* — Tom Y Lu

(74) *Attorney, Agent, or Firm* — Ido Tuchman; Louis J. Percello

(57) ABSTRACT

A method and system for inspecting railway components. The method includes receiving a stream of images containing railway components, detecting a railway component in each image, generating a plurality of feature vectors for each railway component image, measuring the dissimilarity between the railway component and a set of railway components detected in preceding images, in a sliding window, based on the feature vectors.

25 Claims, 9 Drawing Sheets

(56) References Cited

OTHER PUBLICATIONS

Raffay Hamid, et al., "Detection and Explanation of Anomalous Activities: Representing Activities as Bags of Event n-Grams", pp. 1-8, publication unknown.

Kyoko Sudo, "Detecting the Degree of Anomal in Security Video", MVA2007 IAPR Conference on Machine Vision Applications, Tokyo, Japan, pp. 53-56, May 16-18, 2007.

* cited by examiner

ANOMALOUS RAILWAY COMPONENT DETECTION

BACKGROUND

This invention relates to automated railway component inspection, and more particularly to a method and system for anomalous railway component detection.

To maintain safe and efficient operations, railroads typically inspect their tracks for physical defects on a regular basis. Such track inspection normally covers a wide spectrum. Some of these measurements have been automated using a track geometry car, yet others are still manually conducted.

For example, one inspection that is currently manually performed is the monitoring of spiking patterns. A spiking pattern is the layout of spikes on a tie plate, which hold the plate in place to prevent the rail from latitudinal movement. A spiking pattern is defined over two tie plates which fasten one tie. There are 8 spike slots on each tie plate. Consequently, a spiking pattern is determined by the status of 16 spike slots, which could either be spiked or empty.

Based on the class of track, the tonnage and speed of trains traveling on it, and its degree of curvature, a specific spiking pattern will be required for a specific track segment. Applying wrong or noncompliant spiking patterns could potentially lead to derailment. On the other hand, when previously installed spikes are broken or fall off the plate, it will also change the spiking pattern. Furthermore, tie plates of any non-compliant spiking patterns are considered as anomalous tie plates.

Currently, anomaly detection methods have been applied to detection of unusual video events, abnormal object motion patterns, and abnormal vehicle movements. These methods have used trajectory based processes where an appearance model is built to track objects, activity learning techniques where various statistical models are used to learn object activities, or clustering-based techniques where normal or acceptable patterns are pre-grouped into clusters, and anomalies are identified by detecting outliers.

However, railway components are static objects, so most existing solutions will not be applicable. Moreover, clustering analysis is impractical due to the high number of component patterns; for example, in the analysis of tie plates there are $2^{16}$ possible patterns per tie. As such, many railroad inspections are still manually and visually conducted by railroad track inspectors.

BRIEF SUMMARY

Accordingly, one example aspect of the present invention is a method for inspecting railway components. The method includes receiving an image stream of railway components, generating a plurality of feature vectors for an image in the image stream, and comparing the feature vectors of the image to feature vectors from a sliding window of preceding images in the image stream.

Another example of the present invention is a system for inspecting railway components. The system includes a processor and memory coupled to the processor. The memory includes computer readable program code embodied within. The computer readable program code can be configured to receive an image stream of railway components, generate a plurality of feature vectors for an image in the image stream, and compare the feature vectors of the image to feature vectors from a sliding window of preceding images in the image stream.

Yet another example of the present invention is a computer program product for inspecting railway components. The computer program product includes a computer readable storage medium having computer readable program code embodied within. The computer readable program code can be configured to receive an image stream of railway components, generate a plurality of feature vectors for an image in the image stream, and compare the feature vectors of the image to feature vectors from a sliding window of preceding images in the image stream.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1A:
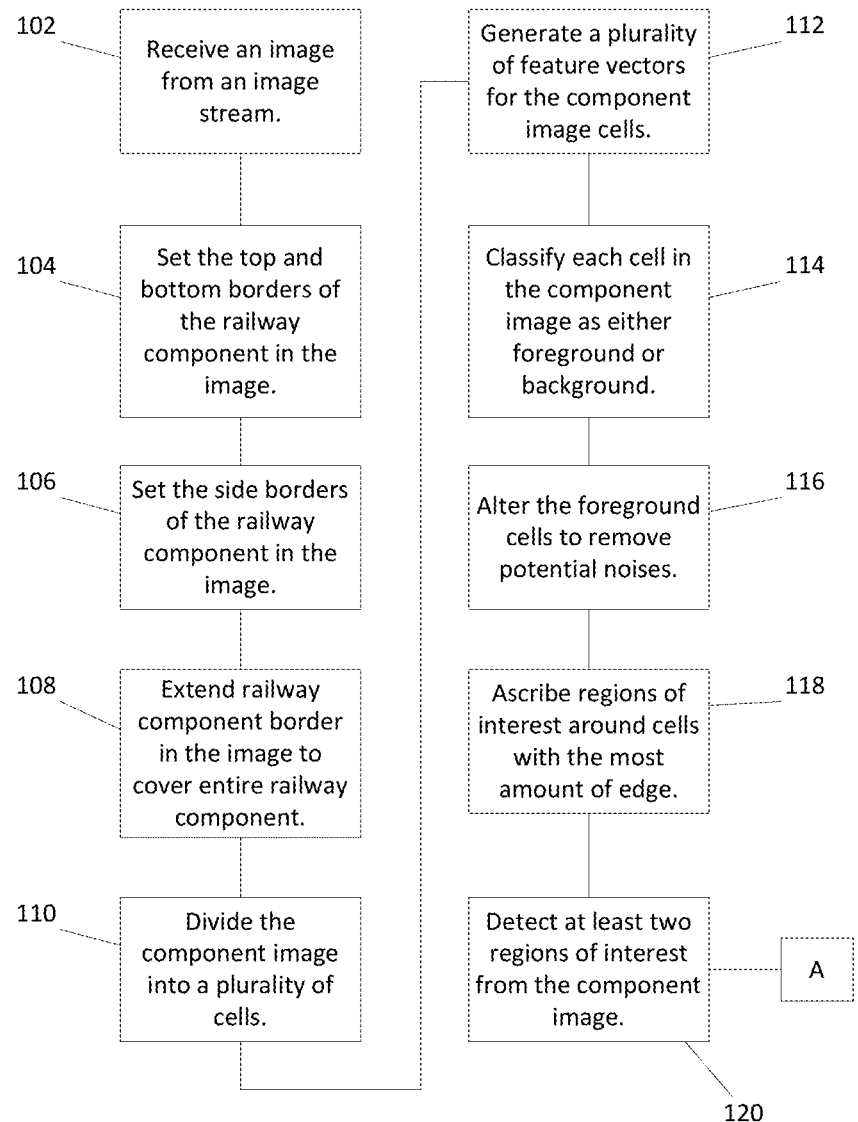
FIGS. 1A-B show a method for inspecting railway components in accordance with one embodiment of the present invention.

The present invention is described with reference to embodiments of the invention. Throughout the description of the invention reference is made to FIGS. 1A-5B. When referring to the figures, like structures and elements shown throughout are indicated with like reference numerals.

Below, the mechanism of detecting anomalous railway component is detailed. Specifically, a tie plate, which is a particular type of railway component, is used as an example to ease the illustration.

As an overview, four steps may be used for the proposed anomalous tie plate detection scheme in accordance with the present invention. Specifically, given a frame, the railroad tie plate region may first be localized, then four characteristic ROIs based on certain criteria may be detected. Next, the top ten salient features can be extracted from each ROI and each ROI is classified into one of two ROI classes. (Example: The ROIs may be classified as either a spike-related ROI or a spike hole-related ROI.) The classification may be performed using a pre-trained support vector machine (SVM) model. Finally, the dissimilarity between the current railroad tie plate and a reference set of railroad tie plates in a sliding window can then be measured, analyzed, and possibly identified as an abnormality.

Figure 1B:
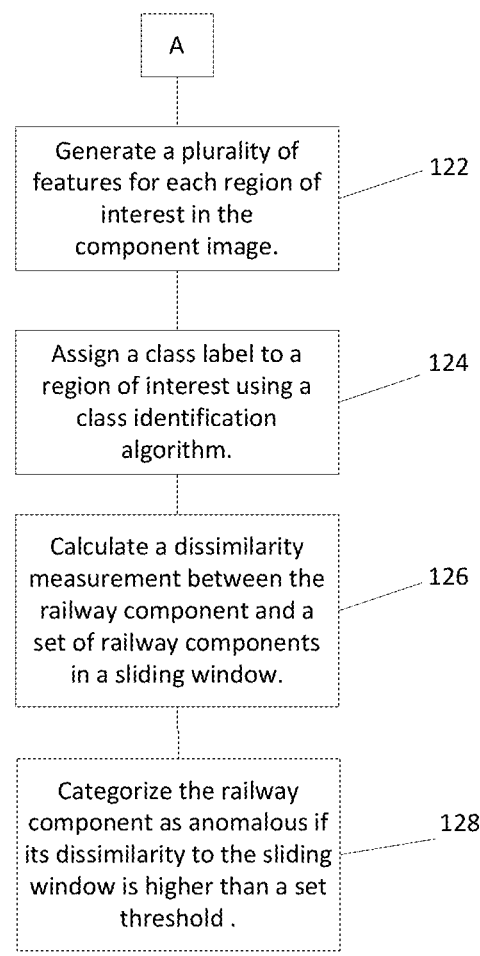

FIGS. 1A-B show a method for inspecting railway components in accordance with one embodiment of the present invention. The method includes a receiving step 102. During receiving step 102, an image stream of the railway is received. In one embodiment, video cameras may be used to generate image streams which may be then received by an onboard computer system. Optionally, up to four video cameras are used, imaging lateral views of the gauge and field sides of both rails. The field of view in this embodiment may be chosen to be 24 inches so as to obtain 50% overlap of neighboring images when traveling at 10 miles per hour. Videos can be captured at 20 frames per second, having 640×350 image resolution with 12 bits of monochrome intensity per pixel. The cameras may be mounted on an aluminum rack, which can be attached to the rear bumper of a hi-rail truck. When the truck travels on the rail, the captured video streams can be processed at real time while at the same time being compressed and written to the disk on the computer, which may be installed in the truck along with an inverter and an uninterruptible power supply (UPS). After the receiving step 102 is completed, the method continues to setting step 104.

At setting step 104, for each image in the stream, the top and bottom borders of the railway component in the image are set using a horizontal line finding algorithm. In one embodiment, a Hough transform is used to detect horizontal lines of the tie plate (see FIG. 3). When a Hough transform is used, a rail track border may serve as one horizontal dividing line 304, and the border of the railway tie plate farthest from the track can serve as the other horizontal dividing line 302. After setting step 104 is completed, the process continues to setting step 106.

At setting step 106, the side borders of the railway component in the image are set using a vertical line finding algorithm. In one embodiment, the vertical line finding algorithm exploits the difference in the amount of textures inside the railway component region and outside the railway component region to find the side borders. Additionally, the algorithm may look between the two horizontal borders for an area whose region equals approximately that of a tie plate and of whose total amount of edge magnitude is minimal 308. After setting step 106 is completed, the process continues to the extending step 108.

At extending step 108, the railway component border in the image is extended so that the border extends around the entire railway component. In one embodiment, when using an image of a tie plate, the tie plate border may be extended by a quarter of its height, where height is the distance between the two horizontal lines 306. Once extending step 108 is completed, the method continues with dividing step 110.

At dividing step 110, the image of the railway component is divided into a number of cells. In one embodiment, the image is divided into cells that are of 4×4 pixels. After dividing step 110 is completed, the method continues to generating step 112. For the rest of description, the image of a railway component is referred to as the image, for the convenience of illustration purpose, unless otherwise specified.

At generating step 112, the image is analyzed and a plurality of feature vectors is produced for the image cells. In one embodiment, each feature vector may include eight Gabor features, four edge features, two color features, and two location features. The Gabor features may contain mean and deviation of the corresponding cell in each of its four orientation maps (of 0, 45, 90 and 135 degrees, respectively), and the edge features may contain average edge magnitude in each of the four directions. Additionally, the color features may consist of mean and deviation of the pixel intensity, and the location features may capture the center position of each cell. After generating step 112, the method continues with classification step 114.

At classification step 114, the image cells are classified as either foreground cells or background cells. In some embodiments, non-rail regions such as railroad spike holes, or railroad spike heads are classified as foreground cells. In one embodiment, K-means clustering is performed to cluster the cells into foreground and background. After classification step 114, the process continues with altering step 116.

Figure 4A:
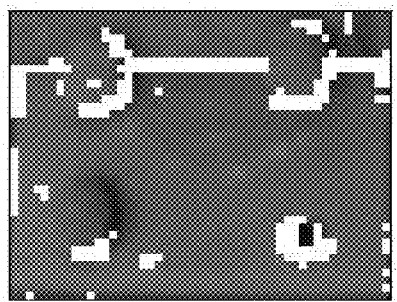
FIG. 4A shows an extended tie plate region where white cells represent extracted foreground.

At altering step 116, the foreground cells are altered to remove any potential noises, as shown in FIG. 4A. In one embodiment, the foreground cells that are very close to the image boundaries are removed from the image, as they tend to be non-component areas. A Sobel edge map may then be used to transform the image. After altering step 116, the method continues to ascribing step 118.

Figure 4B:
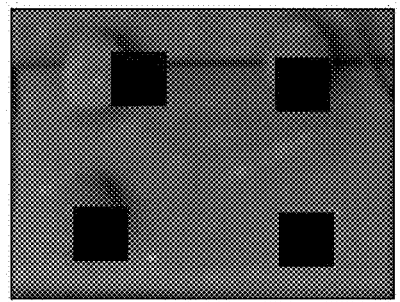
FIG. 4B shows four detected regions of interest (ROI).

At ascribing step 118, regions of interest are ascribed around the image cells that contain the most amounts of edge. In one embodiment the railroad component is first divided into four quadrants before ascribing regions of interest for each quadrant. In another embodiment, the sizes of the regions of interests are chosen to be approximately that of a railroad spike hole, as shown in FIG. 4B. After ascribing step 118, the process continues to detecting step 120.

At detecting step 120, at least two regions of interest are detected from the image. After detecting step 120, the method continues to generating step 122.

Figure 5A:
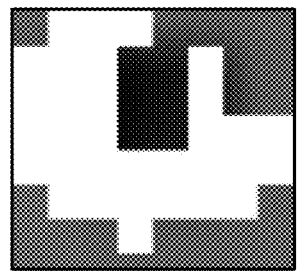
FIG. 5A shows the distribution of foreground (white) and background (gray) cells in a close up ROI for a spike hole.
Figure 5B:
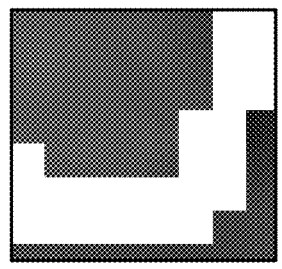
FIG. 5B shows the distribution of foreground (white) and background (gray) cells in a close up ROI for a spike.

At generating step 122, a plurality of features are generated for each region of interest in the image. In one embodiment, 38 features are generated to represent each region of interest in the image. The following are only examples of what features may be used. Feature 1 may be the weight of the foreground, which may be defined as the total number of foreground cells, over the total number of cells within a certain region of interest. FIGS. 5A and 5B show two magnified ROI taken from FIG. 4A, where the first ROI covers an entire spike hole with more foreground cells, and the second ROI covers a portion of spike head with fewer foreground cells. The reason for choosing this feature is that a railroad spike-hole related ROI may contain many more foreground cells than a railroad spike-head related ROI.

Features 2-15 may include 8 Gabor features, 4 edge features, and 2 color features, all of which may be averaged for all foreground cells in the ROI. Features 16-30, are the same as Features 2-15 but calculated for background cells not foreground cells.

Feature 31 may be the horizontal cross correlation ratio (HCCR), which is measured in two steps: (1) calculate the cross correlation between the ROI, and its horizontally flipped version, and (2) find its peak and normalize it by the ROIs auto-correlation. In this way the feature captures any horizontally symmetrical structure in the region of interest. Feature 32 may be the vertical cross correlation ratio (VCCR), which is identical to Feature 31, but flipped vertically instead of horizontally so as to capture any vertically symmetrical structures in the ROI.

Feature 33 may be the edge magnitude ratio of four boundary stripes which reveals the edge distribution within the ROI. This feature may first find four narrow stripes with a width of 5 pixels, to the left and right of the horizontal center, as well as to the top and bottom of vertical center, which have the largest edge magnitude among their peers within respective search regions. This data is then summed up by their magnitudes and normalized by the total number of edge magnitude of the ROI. This feature intends to capture the rectangular shape of a spike hole. Feature 34 may be the total amount of edge magnitude in the ROI.

Feature 35-36 may be the distances between the gravitational center and geometric center of the ROI's edge map, along the x and y directions respectively. These features are intended to capture the edge distribution within the ROI.

Feature 37-38 may be the differences of edge magnitude between the right and left half of the ROI, and between the top and bottom half of the ROI, respectively.

There may be redundancies in the 38 features so optional feature saliency analysis and feature correlation analysis may be performed to identify the top salient features.

In at least one result of such analysis, features 1, 12, 16, 24, 31, 32, 33, 34, 36, and 38, from the above mentioned list, have been shown to be the top features. In one embodiment, these 10 feature are used to represent the regions of interest in place of the 38 features, so as to increase processing efficiency. After generating step 122, the method continues to classifying step 124.

At classifying step 124, the ROIs are analyzed and classified using a class identification algorithm. The class identification algorithm may be a support vector machine (SVM). If the SVM approach is utilized, ROI data may be first collected to train the SVM model, and then the SVM model can be applied to each ROI. In one embodiment, the ROIs are classified as either spike related, or spike hole related, and numerical values are outputted to represent the confidence of the classification. After classifying step 124, the method continues to dissimilarity calculation step 126.

At dissimilarity calculation step 126, a dissimilarity measurement may be calculated between the railway component and a set of railway components in a sliding window.

In one embodiment, the distance dissimilarity measurement between two regions of interest may be denoted by $dist(P^j, P_i^j)$, which indicates the distance or dissimilarity between the $j^{th}$ ROI in railway component P and $P_i$, respectively. Here, P is the railway component in the image, and $P_i$ is the $i^{th}$ railway component in a sliding window. In one embodiment, the sliding window contains a reference set, and may be denoted as $RS=\{P_1, P_2, \ldots, P_N\}$ where it contains the preceding N railway components of the current one. $dist(P^j, P_i^j)$ is calculated as the Euclidean distance between their corresponding feature vectors.

Then, the dissimilarity between the railway components P and Pi may be calculated using a class weighted algorithm:

$$DSM(P,P_i) = \Sigma_{j=1}^{4} w_j \times dist(P^j, P_i^j)$$

Where i=1 . . . N, and N is the total number of railway components in the sliding window. $w^j$ is the weight of $j^{th}$ ROI and can be derived from the ROI classification result. Specifically, it can be determined based on both ROI classification result and the confidence of such classification.

In one embodiment, the classification confidences of $P^j$ and may be denoted as $C^j$ and $C_i^j$, which may be within the range 0 and 1. If the confidences are below a certain threshold (e.g. 0.08), $w_j$ may be set to 1. Otherwise, if the ROIs are of the same type (e.g. two spike related ROIs, or two spike hole related ROIs), $w_j$ may be calculated using:

$$w_j = 1 - (C^j + C_i^j)/2$$

Alternatively, if the ROIs are of different types (e.g. a spike related ROI and a spike hole related ROI), $w_j$ may then be calculated using:

$$w_j = 10^{(c^j + c_i^j)/2}$$

As a summary, the underlying principal of the class weighted algorithm is if two ROIs indicate different objects, then their distance measurement (i.e. $dist(P^j, P_i^j)$) should be boosted; otherwise if they indicate the same type of object with high confidence, the distance dissimilarity measurement shall be deemphasized.

Next, agglomerative clustering analysis is applied to the dissimilarity measurements calculated between the railway component in the image and all railway components in the sliding window, so as to return one single measurement between the sliding window and the said railway component.

In one embodiment, once all the dissimilarity scores between P and all $P_i$(i=1 . . . N) in RS have been calculated, agglomerative clustering analysis is then applied, and the class that has the most number of data points is identified. An average dissimilarity score may then be calculated for the class and dissimilarity between P and reference set RS may be returned. The reason for applying the agglomerative clustering is that due to potential errors in ROI detection and potential inclusion of anomalous tie plates in the RS, inconsistent dissimilarity measurements between P and $P_i$(i=1 . . . N) could be generated. However, by identifying the majority class, such inconsistency issues may be put under control. After dissimilarity calculation step 126, the method continues to categorization step 128.

At categorization step 128, the railway component in the image is categorized as anomalous if its dissimilarity to the sliding window is higher than a set threshold. In one embodiment, after the railway component is categorized, it is pushed into the sliding window reference set, RS, no matter if it is normal or abnormal. Additionally, as the new railway component is pushed into the RS, the railway component farthest from the current one may be removed from the RS, so as to maintain a fixed sliding window size.

Figure 2A:
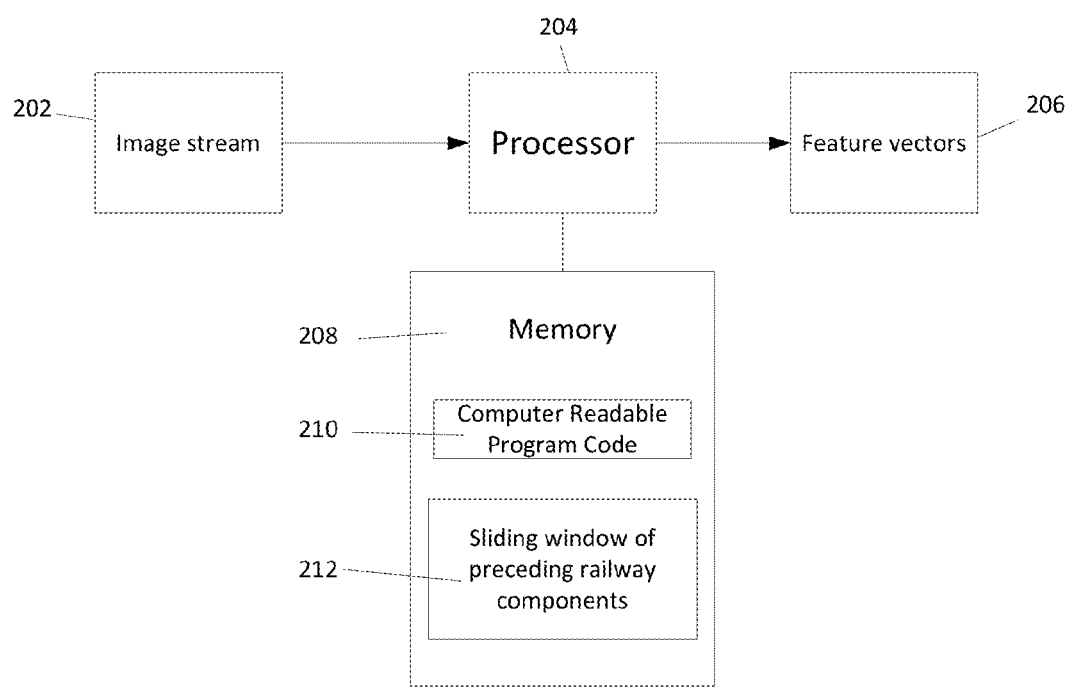
FIGS. 2A-E show a system for inspecting railway components according to one embodiment of the present invention.

FIGS. 2A-E show a system for inspecting railway components according to one embodiment of the present invention. In FIG. 2A, the system includes a processor 204 and memory coupled to the processor 208. The memory 208 has computer readable program code 210 embodied therewith. The computer readable program code 210 is configured to receive an image stream of railway 202. The computer readable program code 210 is further configured to generate a plurality of feature vectors for the railway component in an image in the image stream 206. The computer readable program code 210 is also configured to calculate the dissimilarity between the railway component and a set of railway components in a sliding window 212, based on their feature vectors.

Figure 2B:
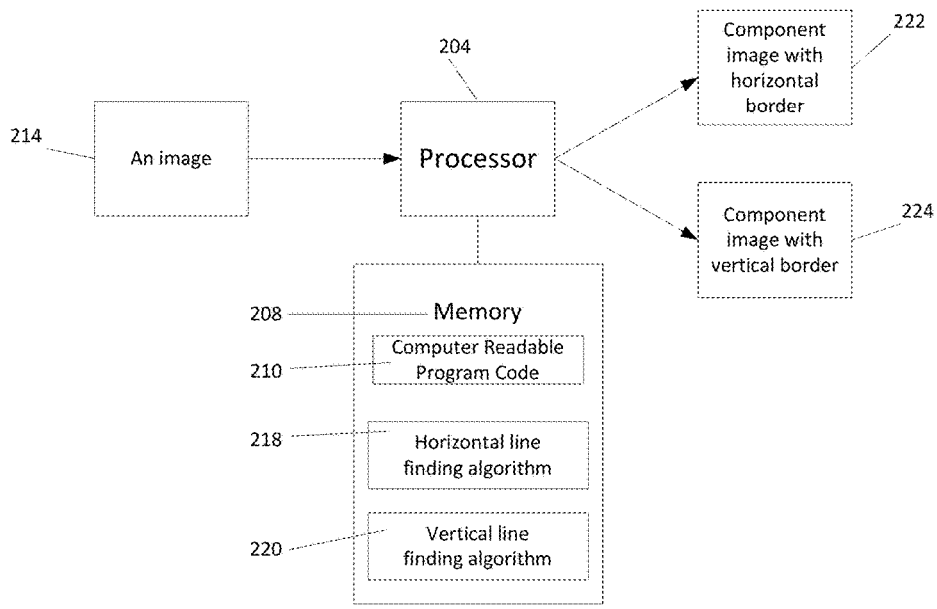

In one embodiment, as shown in FIG. 2B, the processor 204 may receive an image 214 and use a horizontal line finding algorithm 218 to output a component image with horizontal borders 222. Further, the processor 204 may receive an image 214 and use a vertical line finding algorithm 220 to produce a component image with vertical borders 224.

Figure 2C:
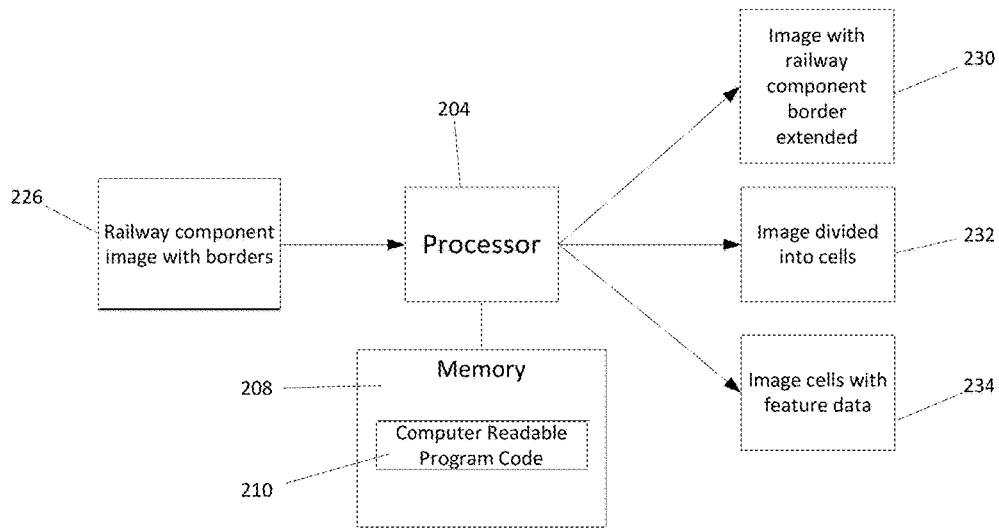

In one embodiment, shown in FIG. 2C, the processor 204 may receive an image of a railway component with borders 226 and output an image with the railway component border extended to cover the entire railway component 230. Further, the processor 204 may also output a component image divided into a plurality of cells 232. Optionally, the processor 204 may also generate image cells with feature data 234.

Figure 2D:
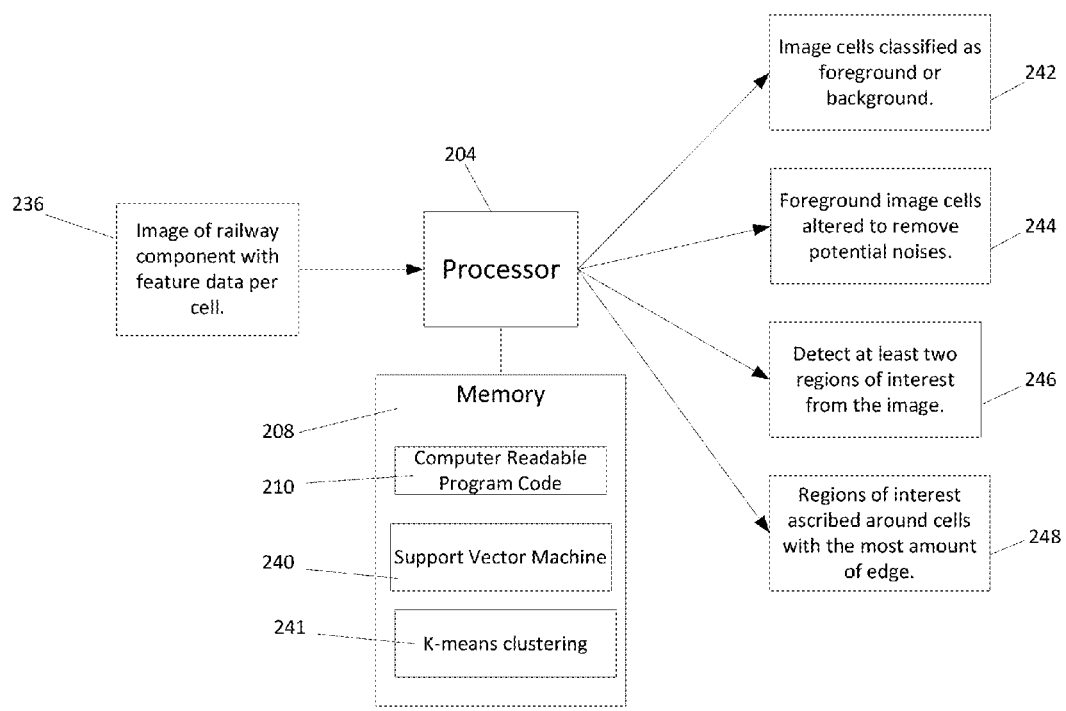

In one embodiment, shown in FIG. 2D, the processor 204 may receive an image of a railway component with feature data per cell 236 and may use a Support Vector Machine 240 or K-means clustering 241 to output image cells classified as foreground or background 242. Further, the processor 204 may also alter the foreground image cells to remove any potential noises 244. Further, the processor 204 may also output at least two regions of interest detected from the image 246. The processor 204 may also ascribe the regions of interest around the cells with the most amount of edge 248.

Figure 2E:
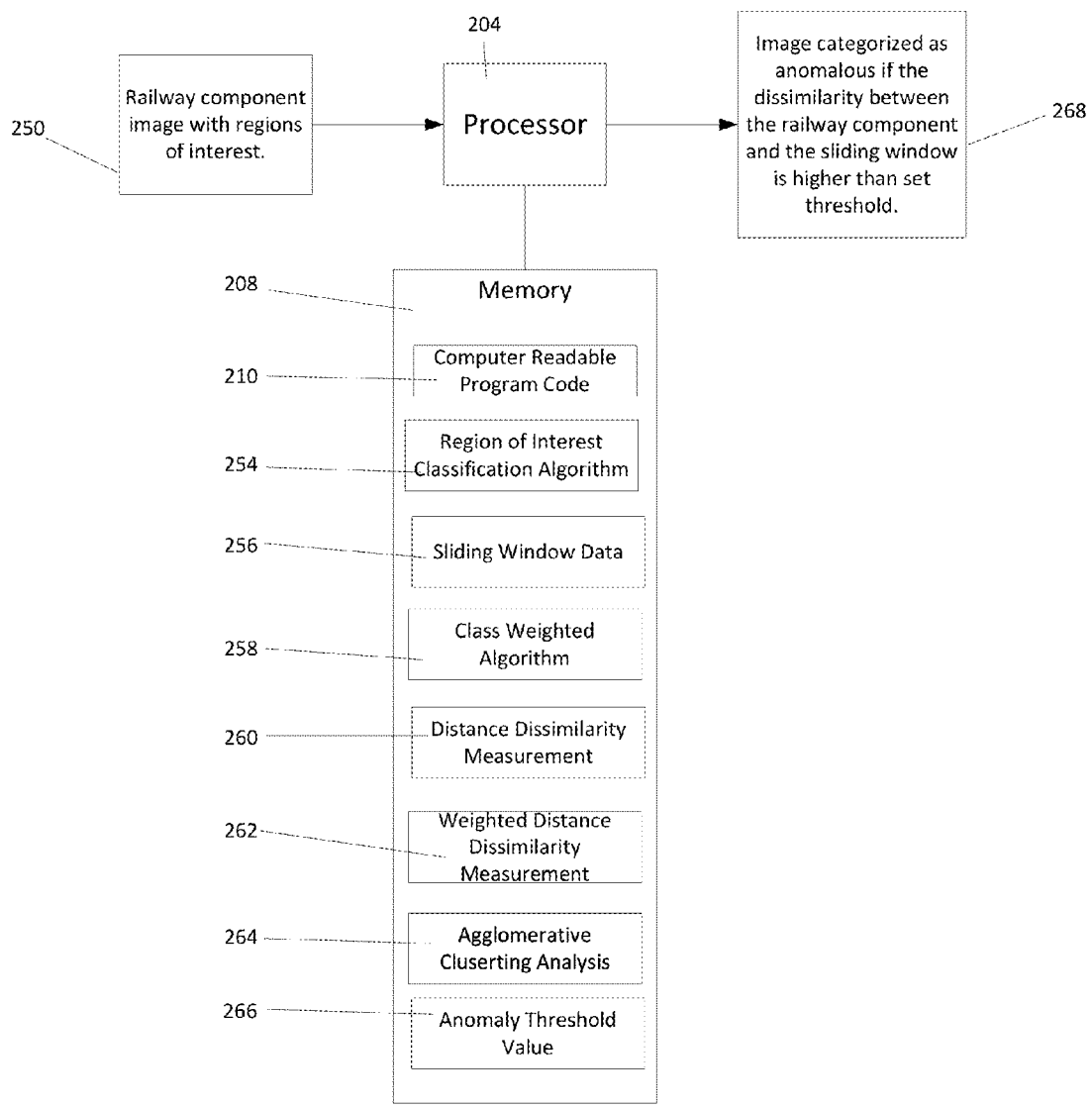
Figure 3:
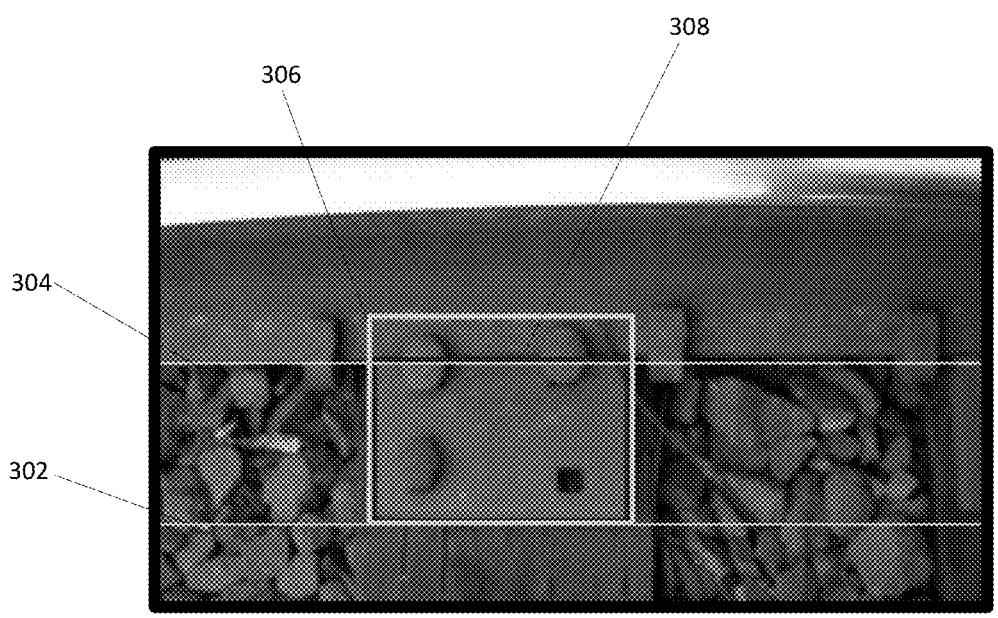
FIG. 3 shows an image example of a railway component, a tie plate that may be analyzed by the present invention for anomalies.

In one embodiment, shown in FIG. 2E, the processor 204 may assign a class label to each region of interest in the railway component image 250 using a region of interest class identification algorithm 254. Further, the processor 204 may measure the dissimilarity between the railway component and a set of components in a sliding window 256 using a class weighted algorithm 258.

Additionally, the class weighted algorithm 258 may also include a distance dissimilarity measurement between corresponding regions of interest 260. Further, the processor 204 may weigh the distance dissimilarity measurement 260 against the classification on the regions of interest using a classification algorithm 254. Further, the processor 204 may apply agglomerative clustering analysis 264 to the output of class weighted algorithm 258. Further, the processor 204 may categorize the image as anomalous 268 if the dissimilarity between the railway component and the sliding window is higher than a set threshold 266.

This method of anomalous detection may also be used to identify spiking pattern change, where the spiking layout of the tie plate has intentionally changed. When there is a pattern change, a series of large dissimilarity scores for several consecutive tie plates will be generated, which have the new spiking pattern. However, with more and more tie plates of the new pattern being pushed into RS, the dissimilarity scores of subsequent tie plates will eventually decrease. Based on such observation, the spiking pattern change can successfully be identified.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for inspecting railway components, the method comprising:
   receiving a stream of images containing railway components;
   detecting a railway component in each image;
   generating a plurality of feature vectors for each railway component in the image; and
   measuring the dissimilarity between the railway component and a set of railway components detected in preceding images, in a sliding window, based on the feature vectors.

2. The method of claim 1, further comprising detecting at least two regions of interest in the railway component image.

3. The method of claim 2, further comprising extending the railway component border in the image to cover the entire railway component.

4. The method of claim 2, further comprising:
   dividing the railway component image into a plurality of cells; and
   classifying each cell in the image as foreground or background.

5. The method of claim 4, further comprising altering the foreground cells in the railway component image to remove potential noises.

6. The method of claim 2, wherein the detecting of regions of interest is based on ascribing said regions around the cells with the most amount of edge.

7. The method of claim 2, further comprising extracting a feature vector containing a plurality of features from each region of interest, and assigning a class label to the said region of interest based on its feature vector using a class identification algorithm.

8. The method of claim 7, wherein the class identification algorithm is a support vector machine.

9. The method of claim 2, wherein the dissimilarity measurement between the railway component and a set of railway components in the sliding window is calculated using a class weighted algorithm.

10. The method of claim 9, wherein the class weighted algorithm includes a distance dissimilarity measurement between corresponding regions of interest.

11. The method of claim 10, wherein the distance dissimilarity measurement is weighted against the classification on the regions of interest using a classification algorithm.

12. The method of claim 9, further comprising
    applying agglomerative clustering analysis to the output of the class weighted algorithm.

13. The method of claim 9, wherein the railway component image is categorized as anomalous if the dissimilarity between the railway component and the sliding window is higher than a set threshold.

14. The method of claim 1, further comprising setting the top and bottom borders of the railway component in the image by using a horizontal-line finding algorithm.

15. The method of claim 1, further comprising setting the side borders of the railway component in the image by using a vertical line finding algorithm.

16. A system for inspecting railway components, the system comprising:
    a processor; and
    a memory coupled to the processor, the memory having computer readable program code embodied therewith, the computer readable program code configured to:
       receive a stream of images containing railway components;
       detect a railway component in each image
       generate a plurality of feature vectors for each railway component in the image; and
       measure the dissimilarity between the railway component and a set of railway components detected in preceding images, in a sliding window, based on the feature vectors.

17. The system of claim 16, the computer readable program code further configured to detect at least two regions of interest based on feature data in each railway component image.

18. The system of claim 17, wherein the computer readable program code are further configured to extend the railway component border in the image to cover the entire railway component.

19. The system of claim 17, wherein the computer readable program code are further configured to:
    divide the railway component image into a plurality of cells; and
    classify each cell in the image as foreground or background.

20. The system of claim 19, wherein the computer readable program code are further configured to alter the foreground cells in the image to remove potential noises.

21. The system of claim 17, wherein the detecting of regions of interest is based on ascribing said regions around the cells with the most amount of edge.

22. The system of claim 17, wherein the computer readable program code are further configured to extract a feature vector containing a plurality of features from each region of interest, and assign a class label to the said region of interest based on its feature vector using a class identification algorithm.

23. The system of claim 22, wherein the class identification algorithm is a support vector machine.

24. The system of claim 17, wherein the dissimilarity measurement between the railway component and a set of railway components in the sliding window is calculated using a class weighted algorithm.

25. A computer program product for inspecting railway components, the computer program product comprising:
    a non-transitory computer readable storage medium having computer readable program code embodied therewith, the computer readable program code configured to:
    receive a stream of images containing railway components;
    detect a railway component in each image
    generate a plurality of feature vectors for each railway component in the image; and
    measure the dissimilarity between the railway component and a set of railway components detected in preceding images, in a sliding window, based on the feature vectors.

* * * * *